United States Patent
Sakai

(10) Patent No.: US 7,698,721 B2
(45) Date of Patent: Apr. 13, 2010

(54) VIDEO VIEWING SUPPORT SYSTEM AND METHOD

(75) Inventor: Tetsuya Sakai, Tokyo (JP)

(73) Assignee: Kabushiki Kaisha Toshiba, Tokyo (JP)

(\*) Notice: Subject to any disclaimer, the term of this patent is extended or adjusted under 35 U.S.C. 154(b) by 612 days.

(21) Appl. No.: 11/520,697

(22) Filed: Sep. 14, 2006

(65) Prior Publication Data
US 2007/0124752 A1 May 31, 2007

(30) Foreign Application Priority Data
Nov. 28, 2005 (JP) ............................. 2005-342339

(51) Int. Cl.
*H04N 7/025* (2006.01)
(52) U.S. Cl. ............................. 725/34; 725/46; 725/47
(58) Field of Classification Search ............. 725/24–31, 725/34–47
See application file for complete search history.

(56) References Cited

U.S. PATENT DOCUMENTS

| | | | | |
|---|---|---|---|---|
| 6,236,395 | B1 * | 5/2001 | Sezan et al. .................. | 715/723 |
| 6,901,207 | B1 * | 5/2005 | Watkins ........................ | 386/83 |
| 7,080,392 | B1 * | 7/2006 | Geshwind .................... | 725/34 |

FOREIGN PATENT DOCUMENTS

JP        2004-23799        1/2004
JP        2004-118483        4/2004

OTHER PUBLICATIONS

Hearst; "Texttiling: Segmenting Text Into Multi-Paragraph Subtopic Passages"; Computational linguistics, vol. 23, No. 1, pp. 33-64, (1997).
Smeaton; "The Trec Video Retrieval Evaluation (TRECVID): a Case Study and Status Report"; Proceedings of RIAO, pp. 1-13, (2003).
Robertson et al.; "Simple, Proven Approaches to Text Retrieval"; University of Cambridge Computer Laboratory Technical Report TR-356, pp. 1-8, (1994).

\* cited by examiner

*Primary Examiner*—Andrew Y Koenig
*Assistant Examiner*—Anthony Bantamoi
(74) *Attorney, Agent, or Firm*—Finnegan, Henderson, Farabow, Garrett & Dunner, L.L.P.

(57) ABSTRACT

System includes unit acquiring video content from video source, unit acquiring text data corresponding to video content from text data source, unit extracting topics from video content based on text data, unit dividing video content into video content segments for each of topics, unit generating one of first thumbnail image, first keyword and first key sentence, unit storing cue words corresponding to video portions, unit comparing text data with cue words to specify first video portion of video portions, first video portion corresponding to first cue word of cue words, unit concealing portion of one of second thumbnail image, second keyword and second key sentence and correspond to specified video portion and generate concealed portion, unit providing, after concealing one portion, combination of each of video content segments and one of second thumbnail image, second keyword and second key sentence, to provide combinations, and unit selecting one of combinations manually.

24 Claims, 13 Drawing Sheets

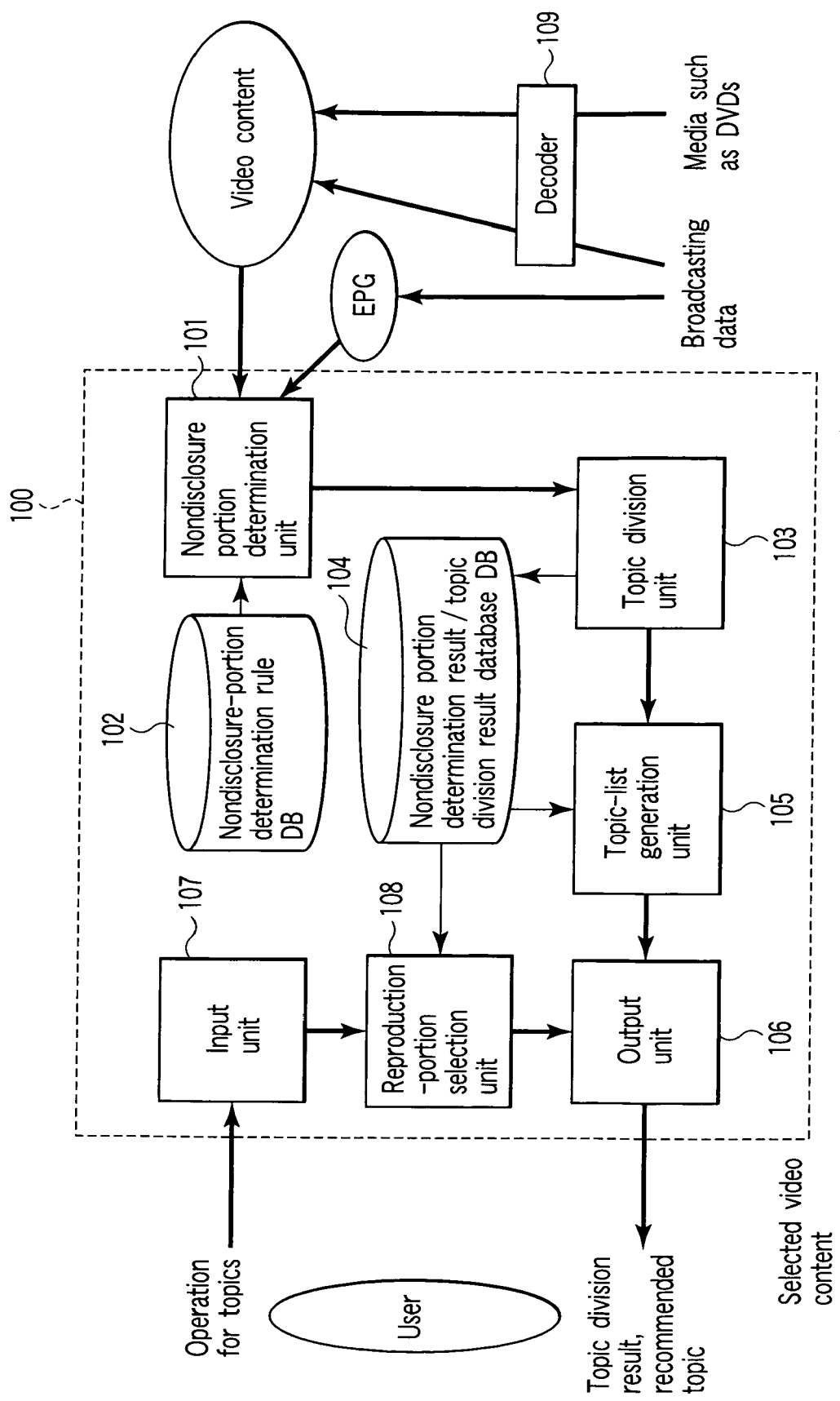
F I G. 1

| TIMESTAMP | |
|---|---|
| 19.805 | Person Name A |
| 26.796 | |
| 29.648 | |
| 39.792 | Beer |
| 44.279 | |
| 46.298 | Curry |
| 50.619 | |
| 54.641 | |
| 64.451 | Person Name B, beer |
| 70.807 | |
| 75.794 | Beer |
| 78.797 | |
| 80.8 | Person Name B |
| 85.804 | Sukiyaki |
| 88.307 | Person Name A |
| 90.826 | Person Name C |
| 94.963 | |
| ⋮ | |

F I G. 4

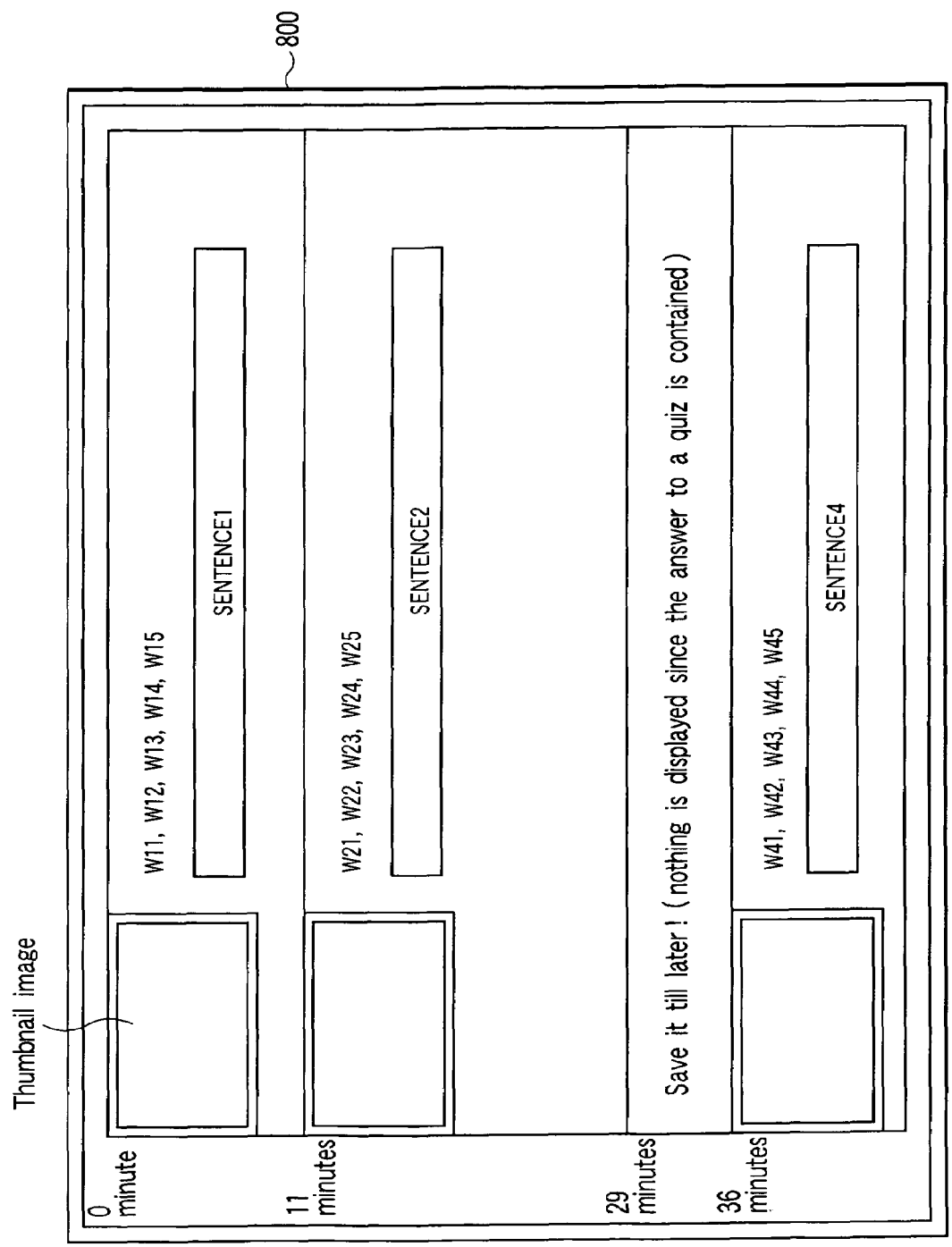
F I G. 8

VIDEO VIEWING SUPPORT SYSTEM AND METHOD

CROSS-REFERENCE TO RELATED APPLICATIONS

This application is based upon and claims the benefit of priority from prior Japanese Patent Application No. 2005-342339, filed Nov. 28, 2005, the entire contents of which are incorporated herein by reference.

BACKGROUND OF THE INVENTION

1. Field of the Invention

The present invention relates to a video viewing support system and method for providing users with video content divided in units of topics, and enabling them to select topics they want to view, thereby realizing efficient viewing of the video content.

2. Description of the Related Art

At present, the audience can access various types of video content, such as TV programs, broadcast by, for example, terrestrial satellite or cable broadcasting, and also can access movies distributed by various media, such as DVDs. It is expected that the amount of viewable content will go on increasing in accordance with an increase in the number of channels and spread of cost-effective media. Therefore, it is possible that "selective viewing", in which at first, the entire structure, e.g., table, of a single piece of video content is skimmed, and then only the interesting portion is selected and viewed, may become prevailing in place of a conventional fashion of viewing in which one piece of video content is viewed from the beginning to the end.

For instance, if two or three particular topics are selected from a two-hour information program containing unorganized topics, and viewed, the total required time is only several tens of minutes, and the remaining time can be used for viewing other programs or for matters other than video content viewing, with the result that an efficient lifestyle can be established.

To realize selective viewing of video content, a user interface may be provided for a viewer (see, for example, JP-A 2004-23799(KOKAI)). The user interface displays a key frame, i.e., a thumbnail image, in units of divided video content items, and displays information indicating the degree of interest of a user, together with each thumbnail image.

The above conventional interface can provide the user with a list of thumbnail images and keywords or key sentences corresponding to respective topics, thereby inducing them to perform selective viewing.

However, when such an interface as the above is actually used for selective viewing, information that the user does not want to have before actual viewing may well be provided for them, thereby spoiling the enjoyment of viewing.

For instance, a keyword for the answer to a quiz or an answer image may be provided for a user who tries to answer the quiz, a thumbnail image with the score of a sport may be provided for a user who is now viewing, it, or a punchline may be provided as a key sentence to a user who tries to view a comedy show.

If such failures often occur, users may well lose interest in the programs before viewing them. Namely, the object of selective viewing to enable the users to select an interesting portion of a program to thereby realize an efficient way of viewing may not be achieved.

As a technique for preventing the enjoyment of viewing of users from being spoiled, there is contrivance, in which mutual reference between a plurality of video content items is utilized to control the order of provision of the items so as to, for example, prevent the result of a sport that a user wants to view from being provided to them before they view the program of the sport (see, for example, JP-A 2004-118483(KOKAI)).

However, since this technique is based on a citation relationship in which a certain part of a content item is cited by another content item, it cannot be utilized for selective viewing based on topic division of a single program (content item). Further, in selective viewing, information that a user does not want to have beforehand may be provided to them. In contrast, in the other technique, only the order of provision of programs is controlled, therefore there is no means for, for example, concealing, from a topic list image, information that a user does not want to have beforehand.

BRIEF SUMMARY OF THE INVENTION

In accordance with a first aspect of the invention, there is provided a video viewing support system comprising: a video acquisition unit configured to acquire a video content from a video source; a data acquisition unit configured to acquire text data corresponding to the video content from a text data source; a topic extraction unit configured to extract a plurality of topics from the video content based on the text data, the topics representing interest scenes of the video content; a division unit configured to divide the video content into a plurality of video content segments for each of the topics, each of the video content segments representing a part of the video content; a generation unit configured to generate at least one of a first thumbnail image, a first keyword and a first key sentence which correspond to each of the video content segments, respectively, and at least one of a second thumbnail image, a second keyword and a second key sentence; a storage unit configured to store a plurality of cue words corresponding to a plurality of video portions, each of the video portions being included in the video content segments; a comparison unit configured to compare the text data with the cue words to specify a first video portion of the video portions, the first video portion corresponding to a first cue word of the cue words; a concealing unit configured to conceal at least one portion of the at least one of the second thumbnail image, the second keyword and the second key sentence, which correspond to the specified first video portion and generate a concealed portion; a providing unit configured to provide, after the concealing unit conceals at least the one portion, a combination of each of the video content segments and at least one of the second thumbnail image, the second keyword and the second key sentence which correspond to each of the video content segments, to provide a plurality of combinations; and a selection unit configured to select at least one of the combinations manually.

In accordance with a second aspect of the invention, there is also provided a video viewing support system comprising: a video acquisition unit configured to acquire a video content from a video source; a data acquisition unit configured to acquire text data corresponding to the video content from a text data source; a topic extraction unit configured to extract a plurality of topics from the video content based on the text data, the topics representing interest scenes of the video content; a division unit configured to divide the video content into a plurality of video content segments for each of the topics, each of the video content segments representing a part of the video content; a storage unit configured to store a plurality of cue words corresponding to a plurality of video portions, each of the video portions being included in the video content segments; a comparison unit configured to compare the text data with the cue words to specify a first video portion of the video portions, the first video portion corresponding to a first cue word of the cue words; a generation unit configured to generate, as a disclosed portion, at least one of a thumbnail image, a keyword and a key sentence which correspond to each of the video content segments, respectively, which fail to contain the specified video portion; a providing unit configured to provide a combination of each of the video content segments and at least one of the thumbnail image, the keyword and the key sentence which correspond to each of the video content segments, to provide a plurality of combinations; and a selection unit configured to select at least one of the combinations manually.

In accordance with a third aspect of the invention, there is also provided a video viewing support system comprising: a video acquisition unit configured to acquire a video content from a video source; a data acquisition unit configured to acquire text data corresponding to the video content from a text data source; a topic extraction unit configured to extract a plurality of topics from the video content based on the text data, the topics representing interest scenes of the video content; a division unit configured to divide the video content into a plurality of video content segments for each of the topics, each of the video content segments representing a part of the video content; a generation unit configured to generate at least one of a first thumbnail image, a first keyword and a first key sentence which correspond to each of the video content segments, respectively, and at least one of a second thumbnail image, a second keyword and a second key sentence; a storage unit configured to store a plurality of cue words corresponding to a plurality of video portions, each of the video portions being included in the video content segments; a comparison unit configured to compare the text data with the cue words to determine whether each of the video content segments contains one of the video portions corresponding to the cue words; a concealing unit configured to conceal at least one portion of the at least one of the second thumbnail image, the second keyword and the second key sentence which correspond to one of the video content segments which is determined to contain one of the video portions corresponding to the cue words by the comparison unit; a providing unit configured to provide, after the concealing unit conceals at least the one portion, a combination of each of the video content segments and at least one of the second thumbnail image, the second keyword and the second key sentence which correspond to each of the video content segments, to provide a plurality of combinations; and a selection unit configured to select at least one of the combinations manually.

In accordance with a fourth aspect of the invention, there is also provided a video viewing support system comprising: a video acquisition unit configured to acquire a video content from a video source; a data acquisition unit configured to acquire text data corresponding to the video content from a text data source; a topic extraction unit configured to extract a plurality of topics from the video content based on the text data, the topics representing interest scenes of the video content; a division unit configured to divide the video content into a plurality of video content segments for each of the topics, each of the video content segments representing a part of the video content; a storage unit configured to store a plurality of cue words corresponding to a plurality of video portions, each of the video portions being included in the video content segments; a comparison unit configured to compare the text data with the cue words to determine whether each of the video content segments contains one of the video portions corresponding to the cue words; a generation unit configured to generate, as a disclosed portion, at least one of a thumbnail image, a keyword and a key sentence which correspond to each of the video content segments, respectively, which fail to contain one of the video portions corresponding to the cue words; a providing unit configured to provide a combination of each of the video content segments and at least one of the thumbnail image, the keyword and the key sentence which correspond to each of the video content segments, to provide a plurality of combinations; and a selection unit configured to select at least one of the combinations manually.

In accordance with a fifth aspect of the invention, there is also provided a video viewing support method comprising: acquiring a video content from a video source; acquiring text data corresponding to the video content from a text data source; extracting a plurality of topics from the video content based on the text data, the topics representing interest scenes of the video content; dividing the video content into a plurality of video content segments for each of the topics, each of the video content segments representing a part of the video content; generating at least one of a first thumbnail image, a first keyword and a first key sentence which correspond to each of the video content segments, respectively, and at least one of a second thumbnail image, a second keyword and a second key sentence;

storing a plurality of cue words corresponding to a plurality of video portions, each of the video portions being included in the video content segments; comparing the text data with the cue words to specify a first video portion of the video portions, the first video portion corresponding to a first cue word of the cue words; concealing at least one portion of the at least one of the second thumbnail image, the second keyword and the second key sentence, which correspond to the specified video portion; providing, after concealing at least the one portion, a combination of each of the video content segments and at least one of the second thumbnail image, the second keyword and the second key sentence which correspond to each of video content segments, providing a plurality of combinations; and selecting at least one of the combinations manually.

In accordance with a sixth aspect of the invention, there is also provided a video viewing support method comprising: acquiring a video content from a video source; acquiring text data corresponding to the video content from a text data source; extracting a plurality of topics from the video content based on the text data, the topics representing interest scenes of the video content; dividing the video content into a plurality of video content segments for each of the topics, each of the video content segments representing a part of the video content; storing a plurality of cue words corresponding to a plurality of video portions, each of the video portions being included in the video content segments; comparing the text data with the cue words to specify a first video portion of the video portions, the first video portion corresponding to a first cue word of the cue words; generating, as a disclosed portion, at least one of a thumbnail image, a keyword and a key sentence which correspond to each of the video content segments, respectively, which fail to contain the specified video portion; providing a combination of each of the video content segments and at least one of the thumbnail image, the keyword and the key sentence which correspond to each of the video content segments, to provide a plurality of combinations; and selecting at least one of the combinations manually.

In accordance with a seventh aspect of the invention, there is also provided a video viewing support method comprising: acquiring a video content from a video source; acquiring text data corresponding to the video content from a text data source; extracting a plurality of topics from the video content based on the text data, the topics representing interest scenes of the video content; dividing the video content into a plurality of video content segments for each of the topics, each of the video content segments representing a part of the video content; generating at least one of a first thumbnail image, a first keyword and a first key sentence which correspond to each of the video content segments, respectively, and at least one of a second thumbnail image, a second keyword and a second key sentence; storing a plurality of cue words corresponding to a plurality of video portions, each of the video portions being included in the video content segments; comparing the text data with the cue words to determine whether each of the video content segments contains one of the video portion corresponding to the cue words; concealing at least one portion of the at least one of the second thumbnail image, the second keyword and the second key sentence which correspond to one of the video content segments which is determined to contain one of the video portions corresponding to the cue words; providing, after concealing at least the one portion, a combination of each of the video content segments and at least one of the second thumbnail image, the second keyword and the second key sentence which correspond to each of the video content segments, to provide a plurality of combinations; and selecting at least one of the combinations manually.

In accordance with an eighth aspect of the invention, there is also provided a video viewing support method comprising: acquiring a video content from a video source; acquiring text data corresponding to the video content from a text data source; extracting a plurality of topics from the video content based on the text data, the topics representing interest scenes of the video content; dividing the video content into a plurality of video content segments for each of the topics, each of the video content segments representing a part of the video content; storing a plurality of cue words corresponding to a plurality of video portions, each of the video portions being included in the video content segments; comparing the text data with the cue words to determine whether each of the video content segments contains one of the video portions corresponding to the cue words; generating, as a disclosed portion, at least one of a thumbnail image, a keyword and a key sentence which correspond to each of the video content segments, respectively, which fail to contain one of the video portions corresponding to the cue words; providing a combination of each of the video content segments and at least one of the thumbnail image, the keyword and the key sentence corresponding to each of the video content segments, to provide a plurality of combinations; and selecting at least one of the combinations manually.

BRIEF DESCRIPTION OF THE SEVERAL VIEWS OF THE DRAWING

FIG. 1 is a schematic block diagram illustrating the configuration of a video viewing support system according to a first embodiment of the invention;

FIG. 4 is a view illustrating a correspondence table generated at step S302 in FIG. 3;

FIG. 8 is a view illustrating another example of the series-of-topic image;

DETAILED DESCRIPTION OF THE INVENTION

Figure 2:
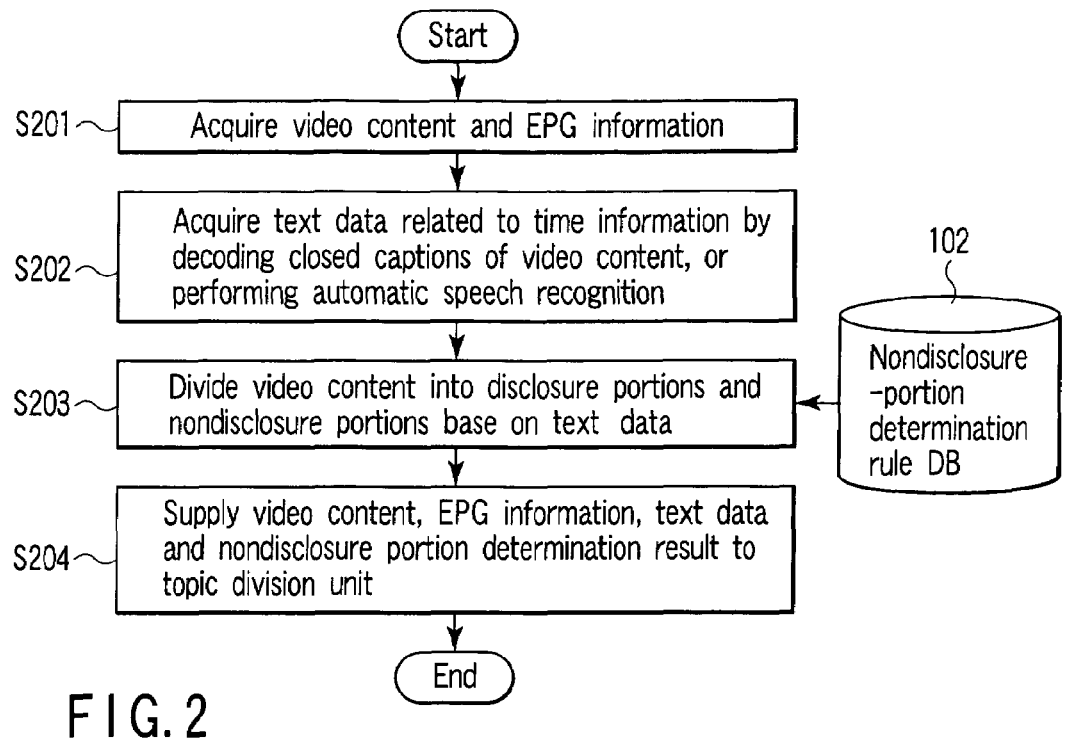
FIG. 2 is a flowchart illustrating an example of a processing flow in the nondisclosure portion determination unit appearing in FIG. 1.

Video viewing support systems and methods according to embodiments of the invention will be described in detail with reference to the accompanying drawings.

The embodiments of the present invention have been developed in light of the above circumstances, and aims to provide a video viewing support system and method for enabling a user to avoid spoiling the enjoyment of viewing.

The video viewing support system and video viewing support method of the embodiments enable users to avoid spoiling the enjoyment of viewing of programs.

First Embodiment

Referring first to FIG. 1, a video viewing support system according to a first embodiment will be described. FIG. 1 is a schematic block diagram illustrating the configuration of the video viewing support system of the first embodiment.

As shown, the video viewing support system 100 of the first embodiment comprises a nondisclosure portion determination unit 101, nondisclosure-portion determination rule database (DB) 102, topic division unit 103, nondisclosure portion determination result/topic division result database 104, topic-list generation unit 105, output unit 106, input unit 107 and reproduction-portion selection unit 108.

The nondisclosure portion determination unit 101 determines, before a user views a video content of a particular category, a boundary for dividing the video content into a video portion suitable for disclosure before viewing, and a video portion unsuitable for it. In the first embodiment, the nondisclosure portion determination unit 101 determines a video portion that should not be viewed before a user views video content of a particular category (e.g., a sport or quiz). The nondisclosure portion determination unit 101 refers to the nondisclosure-portion determination rule database 102 to detect, in acquired video content from a video source (e.g., DVD), a video portion that should not be viewed.

The nondisclosure-portion determination rule database 102 stores natural language expressions as cue phrases. The nondisclosure portion determination unit 101 detects whether the acquired video content contains a portion corresponding to any one of the cue phrases, thereby specifying the video portion that should not be viewed.

The topic division unit 103 divides the video content into topics. The topics represent interesting scenes of the video content.

The nondisclosure portion determination result/topic division result database 104 stores, for each of video content items, the video portion detected by the nondisclosure portion determination unit 101 and the topics acquired by the topic division unit 103.

The topic-list generation unit 105 refers to the nondisclosure portion determination result/topic division result database 104 to generate thumbnail images, keywords, key sentences and topic-list information provided to a user. At this time, the topic-list generation unit 105 refers to the database 104 to conceal the thumbnail image, keyword, key sentence contained in the video portion detected by the nondisclosure portion determination unit 101.

The output unit 106 provides topic-list information or video content. The output unit 106 includes, for example, a display screen.

The input unit 107 includes an input device, such as a remote controller or keyboard, for accepting an operation concerning topics, and operation commands to start or stop reproduction of video content, or to fast-forward video content.

The reproduction-portion selection unit 108 generates video information provided to a user in accordance with the topic selected manually by the user.

The operation of the video viewing support system of FIG. 1 will now be described.

Firstly, the nondisclosure portion determination unit 101 acquires video content supplied from an external device, such as a TV set, DVD player/recorder or hard disk recorder, and decoded by a decoder 109, and determines, referring to the nondisclosure-portion determination rule database 102, a plurality of boundaries for dividing the video content into the portions suitable for disclosure before viewing, and the portions unsuitable for it. When the video content is broadcasting data, electronic program guide (EPG) information concerning the video content may be acquired along with the video content. EPG information contains information indicating the outline or category of a program, and text data as performer information, which are provided by a broadcasting station.

Based on each boundary determined by the nondisclosure portion determination unit 101, the topic division unit 103 performs topic division on the video content, and stores the division results into the nondisclosure portion determination result/topic division result database 104. The topic division unit 103 also stores, into the database 104, nondisclosure portion determination results as the determination results of the nondisclosure portion determination unit 101.

In many cases, video content is provided with text data called closed captions and extractable by a decoder. In such cases, a known topic division method related to text data can be used for the topic division of the video content. For instance, "Hearst, M. TextTiling: Segmenting Text into Multi-Paragraph Subtopic Passages, Computational Linguistics, 23(1), pp. 33-64, March 1997. http//acl.ldc.upenn.edu/ J/J97/J97-1003.pdf" discloses a method for comparing words contained in a text and automatically detecting the cuts in topics.

Further, concerning video content containing no closed captions, an automatic speech recognition technique may be utilized for voice data in video content to acquire text data and use it for topic division, as is disclosed in "Smeaton A., Kraaij, W. and Over, P.: The TREC Video Retrieval Evaluation (TRECVID): A Case Study and Status Report, RIAO 2004 conference proceedings, 2004. http//www.riao.org/Proceedings-2004/papers/0030.pdf".

Based on the topic division results stored in the nondisclosure portion determination result/topic division result database 104, the topic-list generation unit 105 gene rates a thumbnail image or keyword corresponding to each topic segment, and provides it to the user via the output unit 106, such as a TV screen. The user selects manually, from the provided division results, one that they want to view, using the input unit 107, such as a remote controller or keyboard.

Lastly, the reproduction-portion selection unit 108 generates video information to be provided to the user, based on the selection information acquired from the input unit 107, and the topic division results stored in the nondisclosure portion determination result/topic division result database 104, and outputs the information to the output unit 106.

Referring then to FIG. 2, a description will be given of the process performed in the nondisclosure portion determination unit 101 of FIG. 1. FIG. 2 is a flowchart illustrating an example of a processing flow in the nondisclosure portion determination unit 101.

Firstly, broadcasting data or video content from a medium, such as an optical disk, is acquired (step S201). In the case of broadcasting data, EPG information, which contains information indicating the caption of a program, or the category of the program, may be acquired.

Subsequently, the closed captions (subtitle data) from the video content is decoded, or voice data in the video content is subjected to automatic speech recognition, thereby acquiring text data related to time information contained in the video content (step S202).

Based on the text data, the video content is divided into disclosure portions and nondisclosure portions, referring to nondisclosure portion determination rule data stored in the nondisclosure-portion determination rule database 102 (step S203). The nondisclosure-portion determination rule database 102 stores, as the nondisclosure portion determination rule data, a plurality of cue words or expressions, such as "that is a correct answer", "see a correct-answer video scene" in the case of quiz programs, or "criminal", "arrested" in the case of detective stories. The nondisclosure portion determination unit 101 compares the nondisclosure portion determination rule data with, for example, the closed captions of the video content, and may determine, as a nondisclosure portion, the portion of several minutes at the center of which such a cue word or expression as the above is detected. Note that closed captions contain the time of appearance of a certain keyword, as well as text data, therefore the nondisclosure portion determination unit 101 can determine the time of appearance of the nondisclosure portion based on each cue word or expression. With this method, the system can reliably determine a nondisclosure portion, e.g., one that contains an answer in a quiz show or one in which a criminal is revealed in a detective story.

As a modification of the above method, a method for paying attention to changes in the volume of voice data, and setting, as the nondisclosure portion, the video portion of several minutes at the center of which cheers or laughing voices occur, instead of determining the nondisclosure portion based on text data. Further, the modification and the above method may be combined appropriately.

Lastly, the thus-obtained nondisclosure portion determination results are transferred to the topic division unit 103 along with the video content, EPG information and text data.

Figure 3:
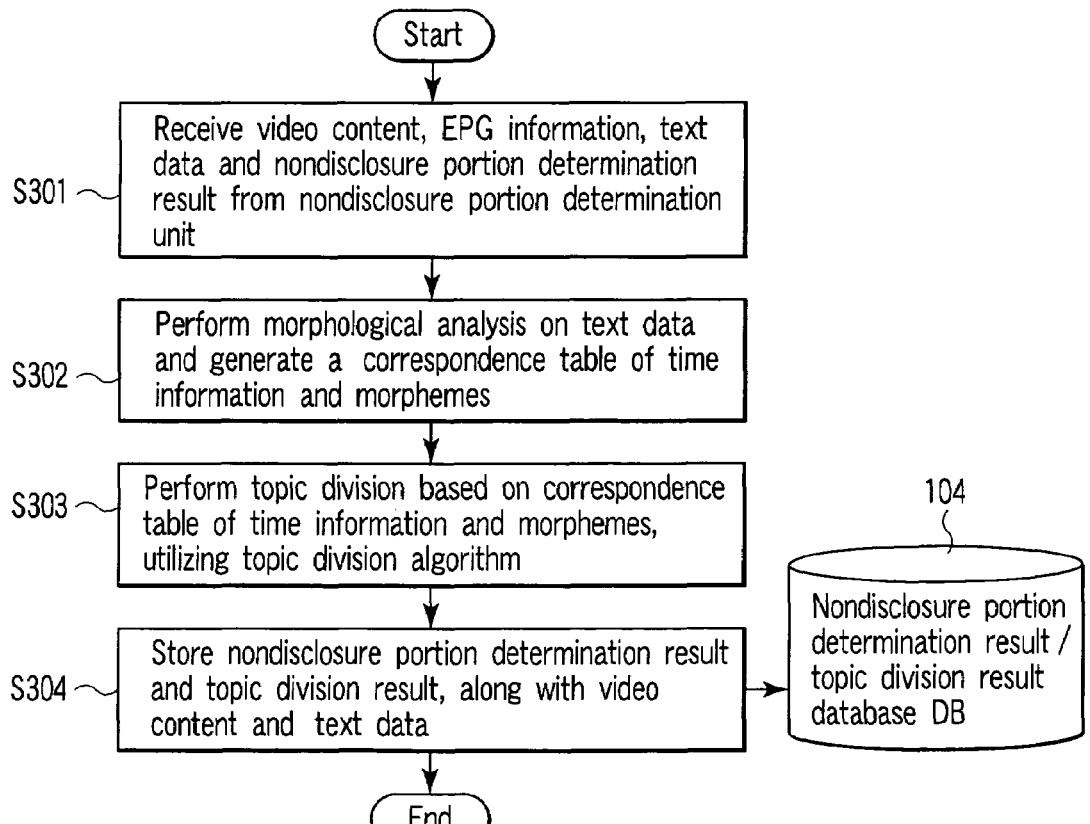
FIG. 3 is a flowchart illustrating an example of a processing flow in the topic division unit appearing in FIG. 1.

Referring to FIG. 3, the process performed in the topic division unit 103 of FIG. 1 will be described. FIG. 3 is a flowchart illustrating an example of a processing flow in the topic division unit 103.

Firstly, the topic division unit 103 receives video content, EPG information, text data and nondisclosure portion determination results (step S301).

Subsequently, if the video content is based on the Japanese language, the text data is subjected to a morphological analysis to acquire word information. If the video content is based on a language, such as English, in which the boundaries of words are clear, stemming is performed. As a result, a table indicating the correspondence between time information and information indicating the appearance of words can be generated (step S302). The correspondence table will be described later with reference to FIG. 4.

After that, based on the text data, a plurality of topics are extracted from the video content, and the video content is divided into a plurality of topic segments for each of topics (step S303), utilizing such an existing topic division algorithm as TextTiling disclosed in "Hearst, M. TextTiling: Segmenting Text into Multi-Paragraph Subtopic Passages, Computational Linguistics, 23(1), pp. 33-64, March 1997. http// acl.ldc.upenn.edu/J/J97/J97-1003.pdf".

The topic division results are stored into the nondisclosure portion determination result/topic division result database 104, along with the nondisclosure information division results, video content and text data (step S304).

Referring to FIG. 4, the correspondence table generated at step S302 will be described. In the correspondence table, the words acquired by the morphological analysis are made to correspond to the times of appearance of the words. In this case, division may be performed when a new word appears. For instance, in the case of FIG. 4, topic division is performed at times 19.805 sec., 64.451 sec. and 90.826 sec. elapsing from the beginning of the video content, at which "Person Name A", "Person Name B" and "Person Name C" appear for the first time.

In the above description, the process by the topic division unit 103 is executed completely independent of the process by the nondisclosure portion determination unit 101. However, the first embodiment is not limited to this. Modifications of the first embodiment, in which both the processes are related to each other, will be described with reference to FIG. 5.

Figure 5:
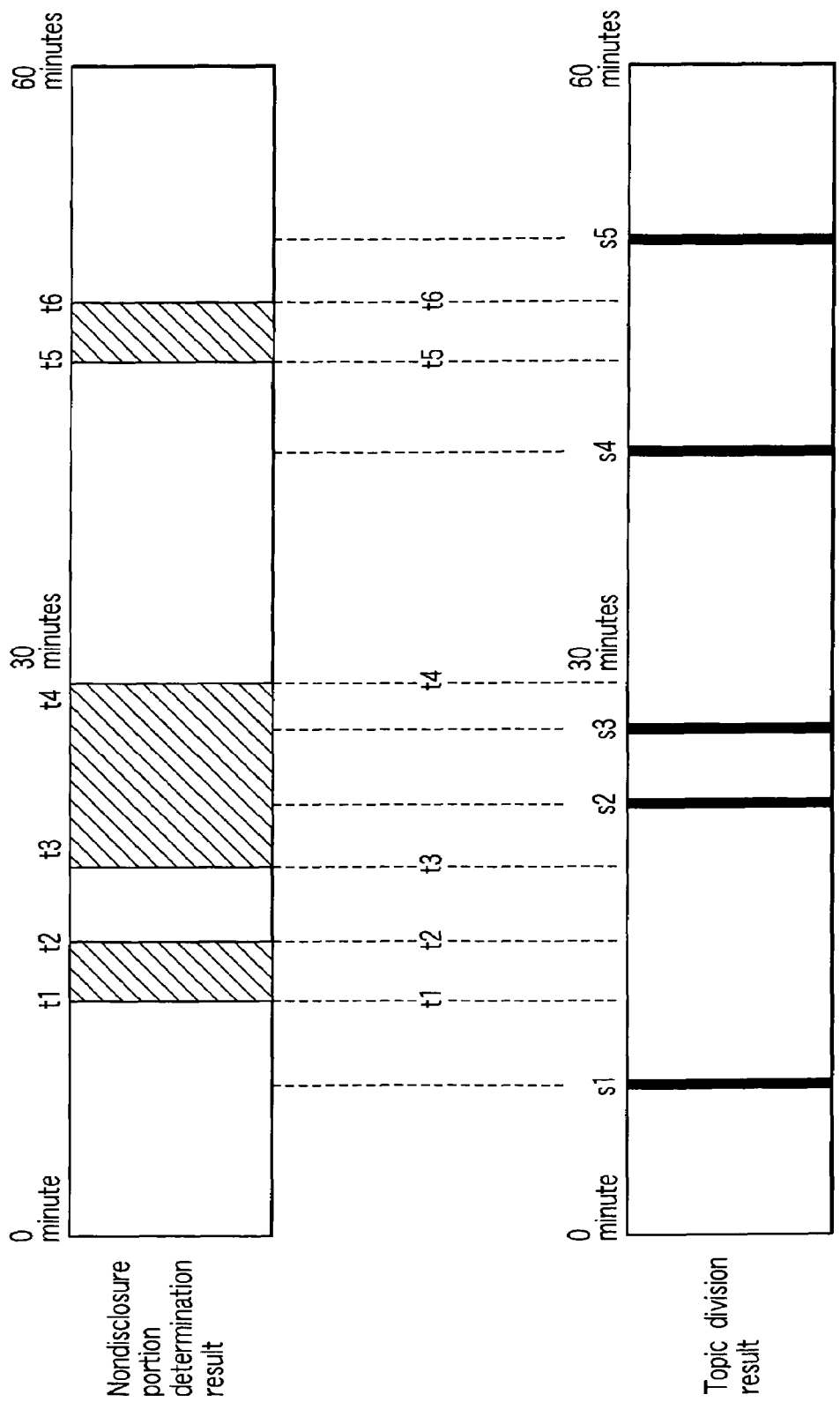
FIG. 5 is a view illustrating an example of a result of nondisclosure portion determination and an example of a result of topic division.

FIG. 5 is a view illustrating an example of a result of nondisclosure portion determination performed on a TV program of 60 minutes, and an example of a result of topic division performed on it. In the upper portion of FIG. 5 that shows the result of nondisclosure portion determination, the nondisclosure portion determination unit 101 determines that the portions between time points t1 and t2, between time points t3 and t4 and between time points t5 and t6 are nondisclosure portions. Time points t1 to t6 denote the times elapsing from the start time of video content. On the other hand, in the lower portion of FIG. 5 that shows the result of topic division, the topic division unit 103 determines that time points s1, s2, s3, s4 and s5 are topic division points. In FIG. 5, time points s1, s2, s3, s4 and s5 are denoted by the thick lines of a certain width for facilitating visualization. Actually, however, they have no widths of time and merely indicate respective moments.

In the example of FIG. 5, the topic division unit 103 can provide a more accurate topic division result based on the nondisclosure portion determination result. For instance, in the lower portion of FIG. 5, a single topic segment is defined between time points s1 to s2. However, if the upper and lower portions of FIG. 5 are combined, four sub-segments can be defined between s1 and t1, between t1 and t2, between t2 and t3 and between t3 and s2. In this case, the sub-segments defined between s1 and t1 and between t2 and t3 are topic segments that may be disclosed to the user, while the sub-segments defined between t1 and t2 and between t3 and s2 are topic segments that should not be disclosed to the user.

In contrast, it is also possible that the topic division unit 103 employs a method for dividing video content into larger units based on the nondisclosure portion determination result. For instance, in FIG. 5, since the topic segment between s2 and s3 is completely included in the nondisclosure portion between t3 and t4, t3 and t4 are used as topic boundaries, instead of s2 and s3.

As a modification of the video viewing support system of FIG. 1, nondisclosure portion determination may be performed after topic division, instead of performing the latter after the former. In this case, the nondisclosure portion determination unit only determines whether each topic segment is suitable for disclosure, instead of utilizing heuristics such as the use, as a nondisclosure portion, of a portion of several minutes, at the center of which a cue word appears.

Figure 6:
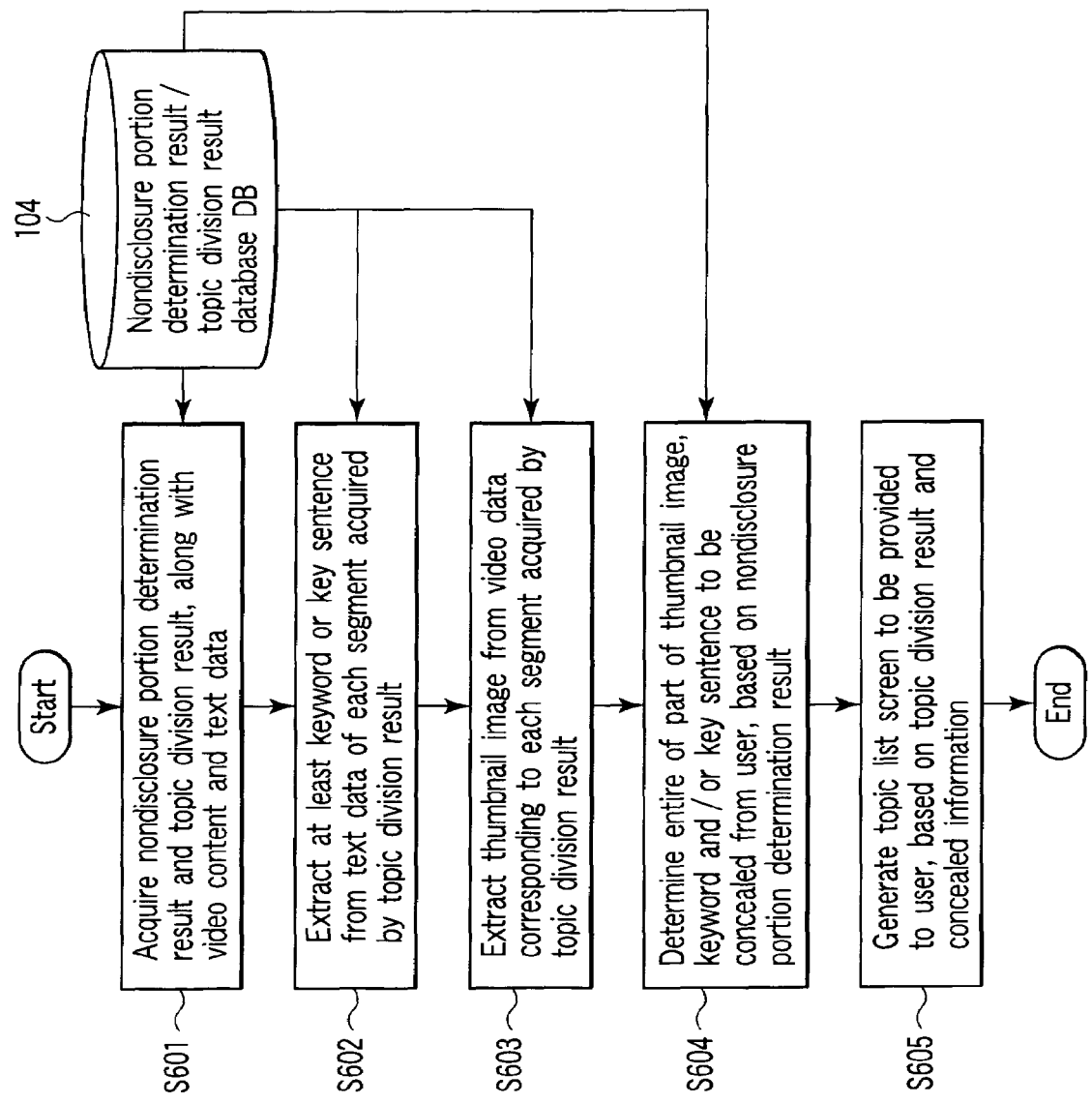
FIG. 6 is a flowchart illustrating an example of a processing flow in the topic-list generating unit appearing in FIG. 1.

Referring to FIG. 6, the process performed in the topic-list generation unit 105 of FIG. 1 will be described. FIG. 6 is a flowchart illustrating an example of a processing flow in the topic-list generation unit 105.

Firstly, the topic-list generation unit 105 acquires the nondisclosure portion determination result and topic division result from the nondisclosure portion determination result/ topic division result database 104, along the video content and text data (step S601).

Subsequently, the topic-list generation unit 105 extracts at least a keyword or key sentence, which indicates the feature of each topic segment, from the text data corresponding to each topic segment included in the topic division result stored in the nondisclosure portion determination result/topic division result database 104 (step S602).

It is sufficient if a keyword selection method employed for, for example, relative feedback in information retrieval may be applied as a method for selecting a keyword. A specific keyword selection method is disclosed in, for example, "Robertson, S. E. and Sparck Jones, K.: Simple, proven approaches to text retrieval, University of Cambridge Computer Laboratory Technical Report TR-356, 1997. http://www.cl.cam.ac.uk/ TechReports/UCAM-CL-TR-356.pdf". Further, extraction of a key sentence can be realized simply by computing the weight of a sentence based on the sum of the weights of keywords contained in the sentence.

After that, a thumbnail image representing each topic segment is generated (step S603). To this end, an image acquired several seconds after the start point of each topic segment may be used as the thumbnail image, or an image corresponding to the time point of appearance of the key sentence may be selected.

Based on the nondisclosure portion determination result stored in the nondisclosure portion determination result/topic division result database 104, the topic-list generation unit 105 determines a thumbnail image or part of the thumbnail image, keyword and/or key sentence, which should be concealed from the user, and processes them so that they will not be displayed (step S604). To realize the concealed state, a nondisclosure tag (e.g., a banner) is provided on the thumbnail image or part of the thumbnail image, keyword and/or key sentence to conceal them. A specific concealing method will be described later.

Lastly, the topic list image constructed as the above is transferred to the output unit 106 to provide it to the user.

Figure 7:
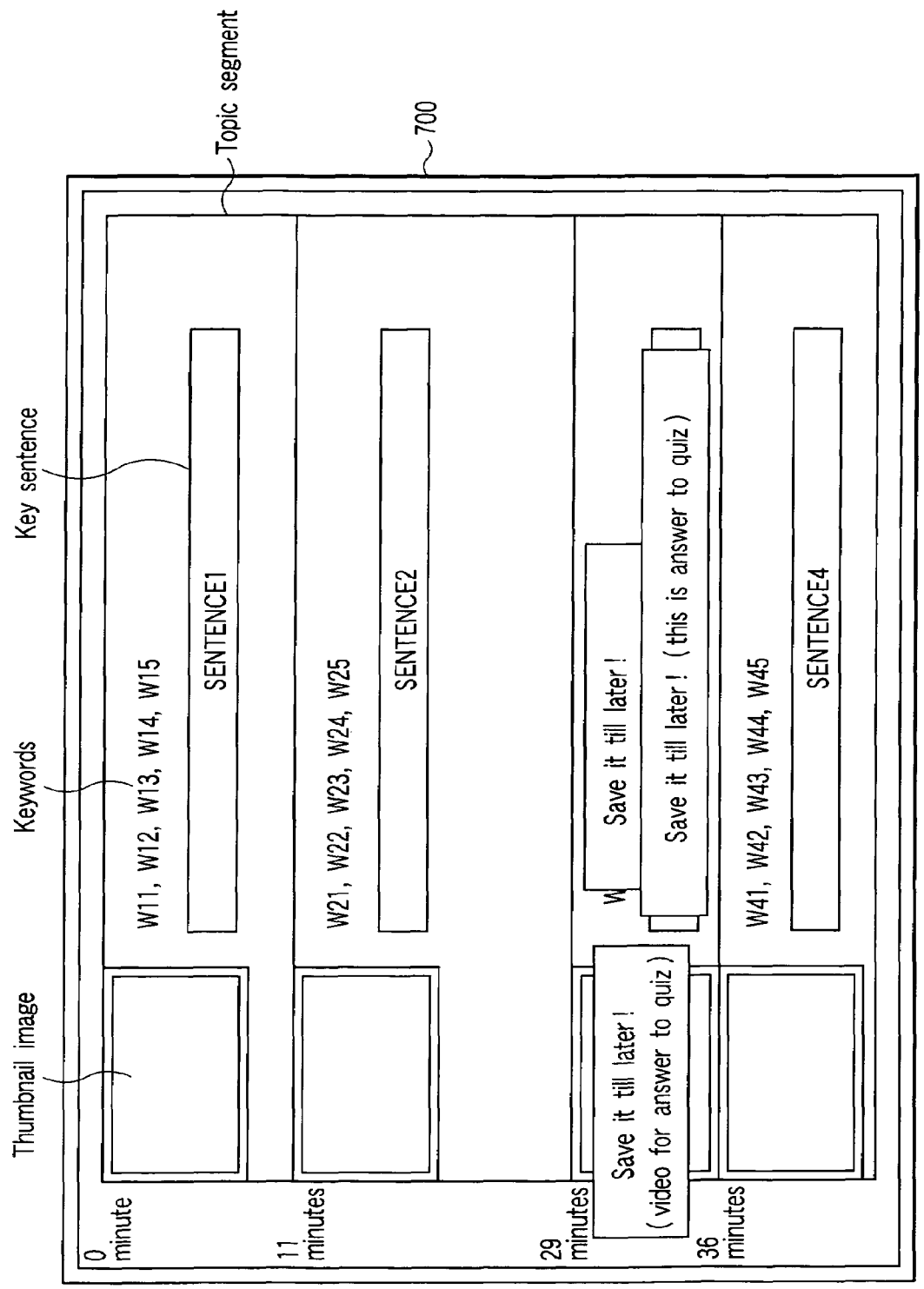
FIG. 7 is a view illustrating an example of a series-of-topic image output from the output unit appearing in FIG. 1.

Referring to FIG. 7, a display image example of the topic list screen employed in the embodiment will be described. The example of FIG. 7 includes four topic segments acquired by the division of the topic division unit 103. A thumbnail image, keyword and key sentence selected in units of topic segments are displayed. Actually, not all the thumbnail image, keyword and key sentence are selected. Only the thumbnail image, or only the thumbnail image and key sentence may be displayed.

In FIG. 7, the third segment is determined by the nondisclosure portion determination unit 101 to include nondisclosure information. Accordingly, in this segment, banners "Save it till later" are displayed as nondisclosure tags for concealing the thumbnail image, keyword and key sentence. In this case, a cue expression, such as "Let's see what the right answer is", is detected in the text data of closed captions, and hence the banners state that the correct answer of a quiz is concealed. Instead of concealing the thumbnail image with a banner, another type of nondisclosure tag, such as a mosaic tag, may be performed on the thumbnail image, thereby making it difficult to see the image. As other nondisclosure tags, a balloon, a hatching tag and a blurring tag can be exemplified.

Referring to FIG. 8, another display image example of the topic list screen will be described. In the example of FIG. 8, no thumbnail image, keyword or key sentence is displayed for a topic segment that contains nondisclosure information, and instead, a message "save it till later! (nothing is displayed since the answer to a quiz is contained)" is displayed.

Figure 9A:
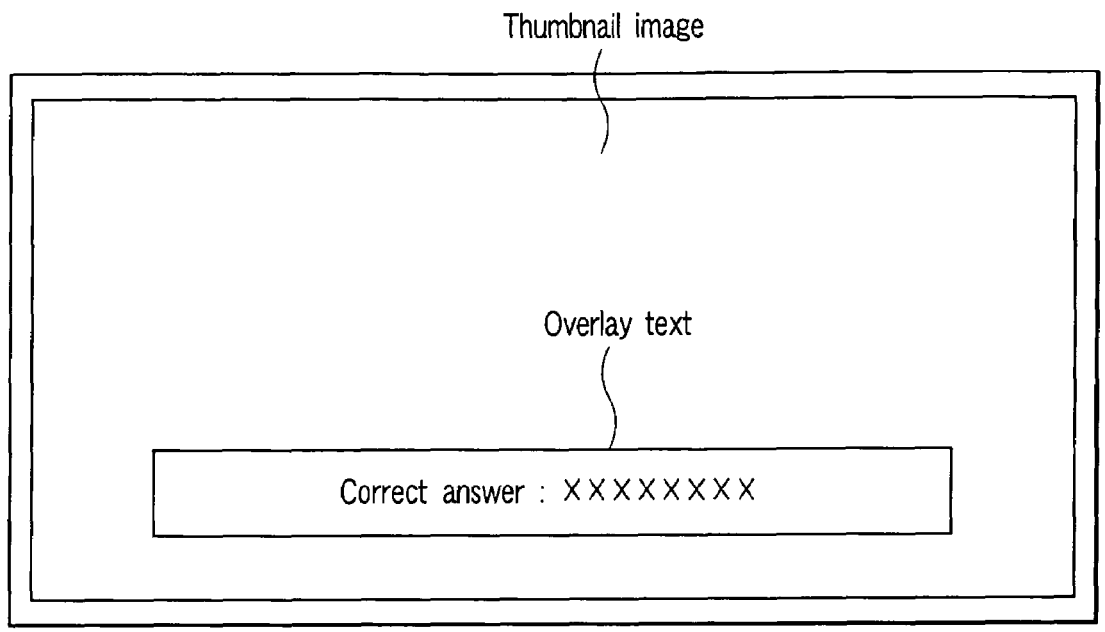
FIG. 9A is a view illustrating a thumbnail image acquired before a concealing process.
Figure 9B:
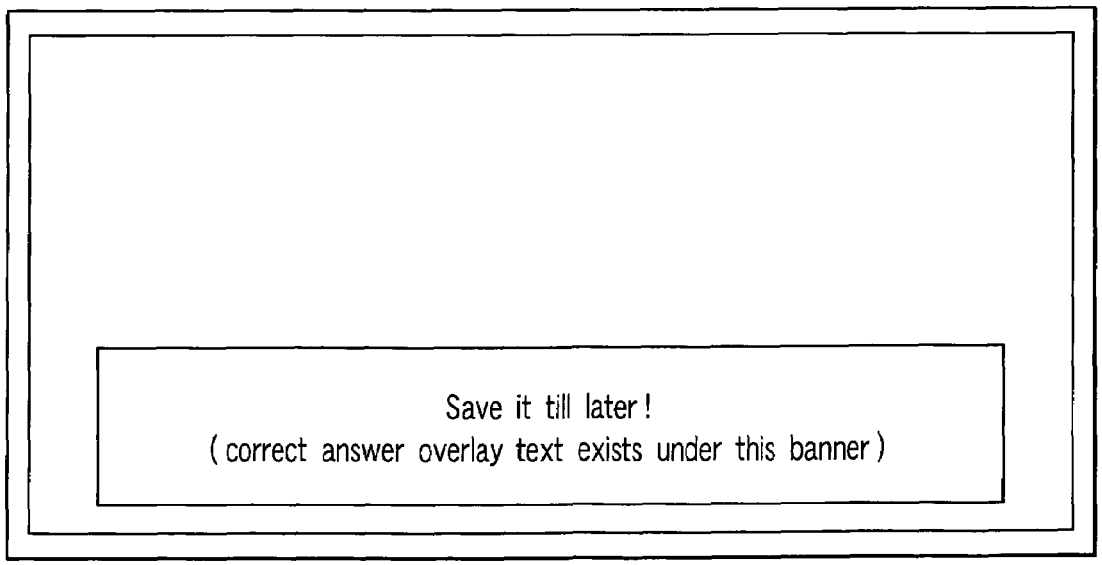
FIG. 9B is a view illustrating a thumbnail image corresponding to that of FIG. 9A and acquired after the concealing process.

Referring to FIGS. 9A, 9B, 10A and 10B, a description will be given of the case of concealing part of a thumbnail image. FIG. 9A shows a thumbnail image acquired before a concealing process. FIG. 9B shows a thumbnail image corresponding to that of FIG. 9A and acquired after the concealing process.

In the case of FIGS. 9A and 9B, an existing overlay-text (open captions) recognition technique is performed on a thumbnail image, the position of an overlay text is determined, and a banner for concealing the text is generated and displayed. If a character string, such as "correct answer", is detected in the overlay text, a message "correct answer overlay text exists under this banner" can be displayed on the banner as shown in FIG. 9B. If it is difficult to recognize characters included in the overlay text, only the position of the overlay text may be detected, and all overlay texts that seem to include nondisclosure information may be concealed by banners with a message "Save it till later".

Figure 10A:
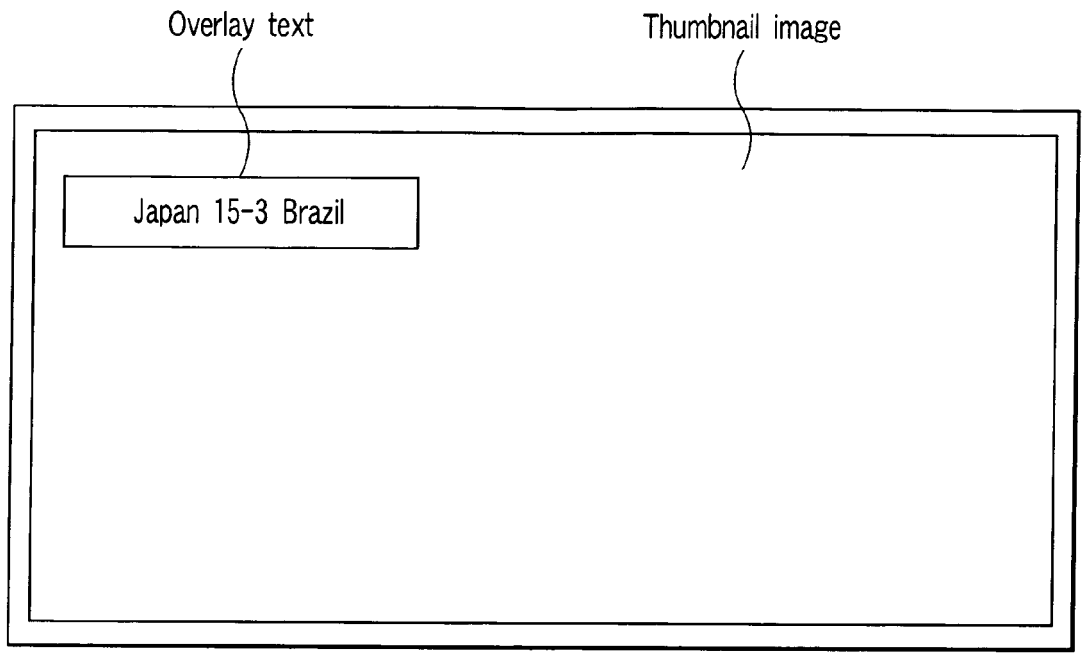
FIG. 10A is a view illustrating another thumbnail image acquired before the concealing process.
Figure 10B:
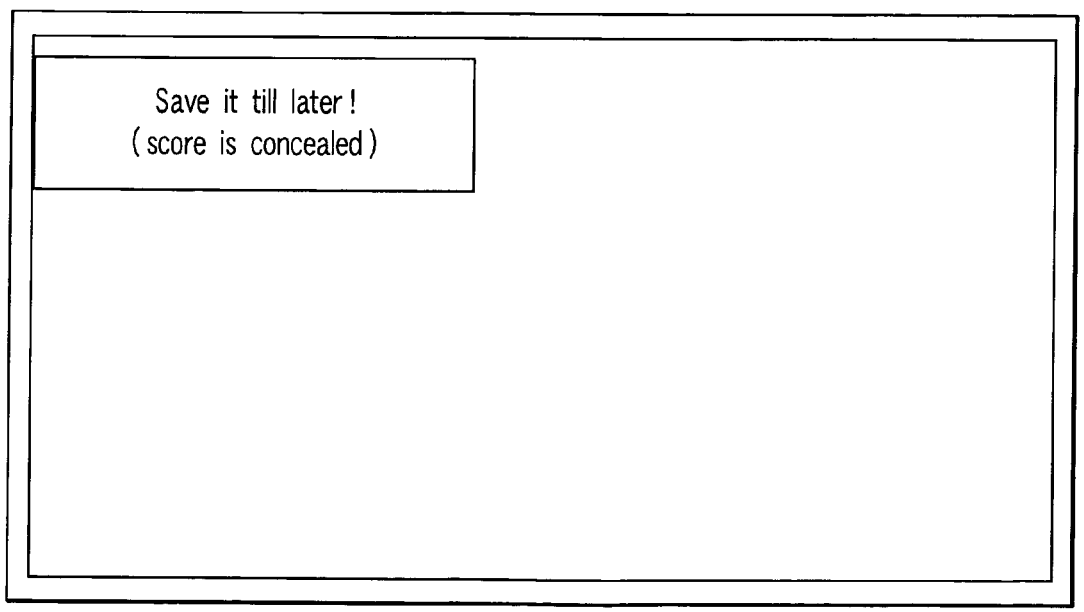
FIG. 10B is a view illustrating a thumbnail image corresponding to that of FIG. 10A and acquired after the concealing process.

FIGS. 10A and 10B show a thumbnail image related to a sport program not a quiz program, where the portion in which score information is indicated by an overlay text is concealed. Since the genre information is available in the EPG, the system can easily identify a sports program, for which it can detect overlays that lasts for several seconds and assume with high confidence that they contain score information. In this case, in the topic list screen shown in FIG. 7, banners for concealing score information are attached to all thumbnail images.

In the above embodiment, a thumbnail image, keyword and key sentence are extracted even from the data determined to be nondisclosure data by the nondisclosure portion determination unit 101, as well as from the data determined to be disclosure data, and are concealed when necessary. However, the nondisclosure data may be beforehand excluded from the targets on which thumbnail image, keyword and/or key sentence extraction is performed.

For instance, when thumbnail images, keywords and key sentences corresponding to the segments existing between time points s4 and s5 in FIG. 5 are extracted (steps S602 and S603), if the image and closed caption text existing between t5 and t6 are excluded from the extraction targets, the risk of providing nondisclosure information to the user can be reduced. In this case, it is sufficient if the thumbnail images, keywords and key sentences selected from the portions defined between time points s4 and t5 and between time points t6 and s5 are displayed, without displaying banners with "Save it till later".

Figure 11:
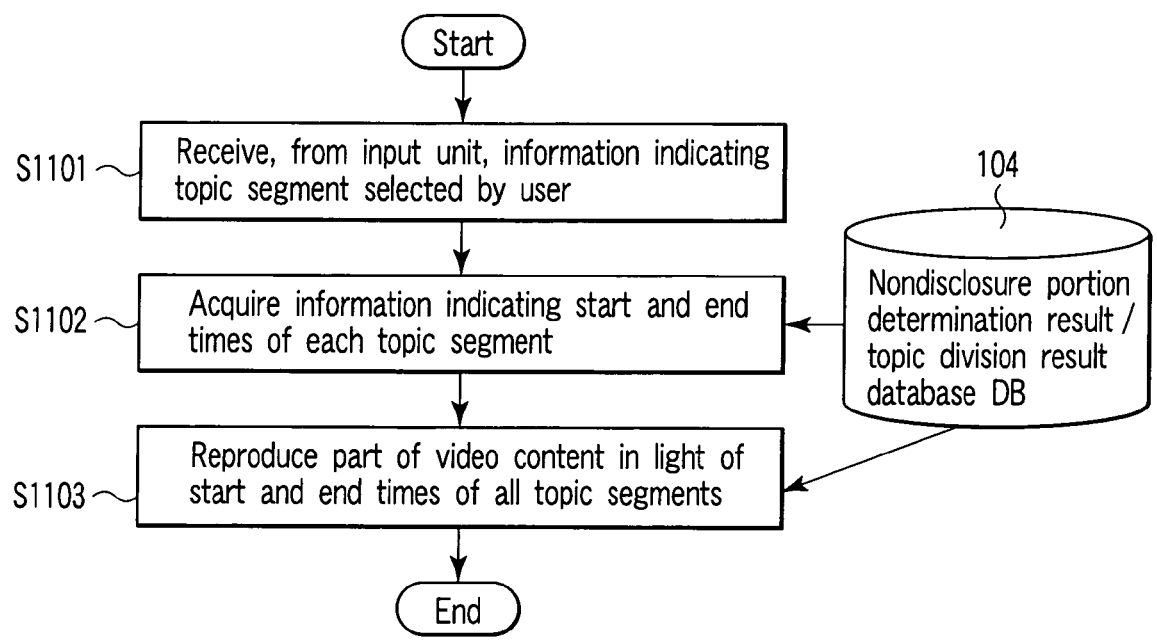
FIG. 11 is a flowchart illustrating an example of a processing flow in the reproduction-portion selection unit appearing in FIG. 1.

Referring to FIG. 11, the process in the reproduction-portion selection unit 108 of FIG. 1 will be described. FIG. 11 shows an example of a processing flow in the reproduction-portion selection unit 108.

Firstly, the reproduction-portion selection unit 108 receives information indicating the topic segment selected manually by the user through the input unit 107 (step S1101).

Subsequently, it acquires TIMESTAMP information indicating the start and end time points of each topic segment from the nondisclosure portion determination result/topic division result database 104 (step S1102).

After that, it determines which portions of all topic segments should be reproduced, in light of the start and end time points of all topic segments, and reproduces portions of the video content based on the determined portions (step S1103).

As described above, in the first embodiment, the interface that induces users to perform selective viewing utilizing topic division performed on programs can avoid the case of beforehand providing the users with information that they do not want to have before actual viewing, thereby preventing their enjoyment of viewing from being spoilt.

Second Embodiment

A second embodiment of the invention is similar in structure to the first embodiment, and differs therefrom only in that the input by a user is fed back to the nondisclosure-portion determination unit. A description will be mainly given of the feedback processing of the nondisclosure-portion determination unit.

Figure 12:
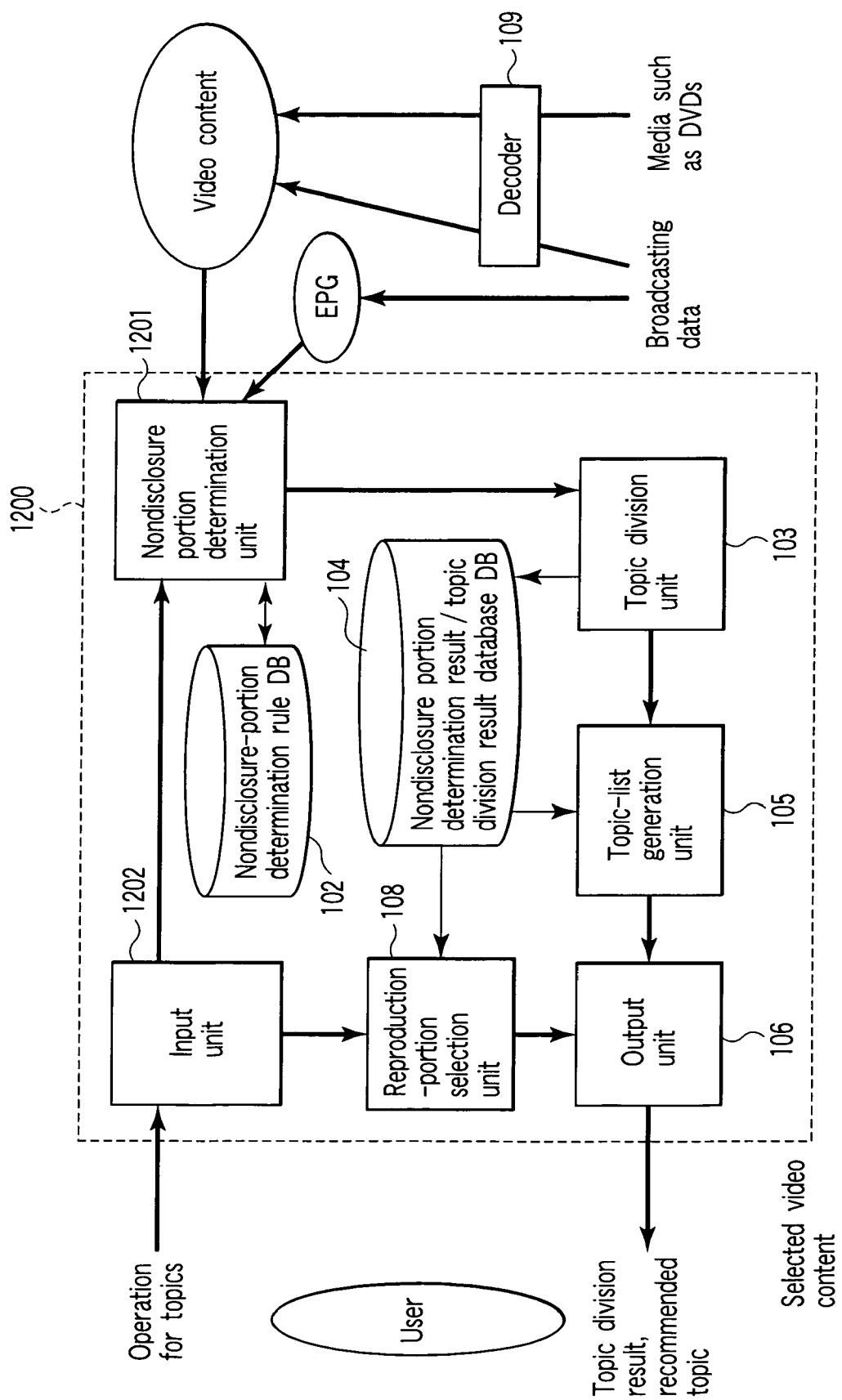
FIG. 12 is a schematic block diagram illustrating the configuration of a video viewing support system according to a second embodiment of the invention.

Referring to FIG. 12, the video viewing support system of the second embodiment will be described. FIG. 12 is a schematic block diagram illustrating the configuration of the video viewing support system of the second embodiment. In FIG. 12, elements similar to those employed in the first embodiment are denoted by corresponding reference numbers, and no description is given thereof.

In addition to the process of the input unit 107, an input unit 1202 is designed to perform concealing or revealing of displayed data (e.g., a thumbnail image, keyword or key sentence) for each of topic segments of certain video content, when it is operated by the user.

In addition to the process of the nondisclosure portion determination unit 101, a nondisclosure portion determination unit 1201 is designed to update the determination rule data stored in the nondisclosure-portion determination rule database 102, based on input information supplied by the input unit 1202. The input information indicates, for each of topic segments of certain video content, whether data should be concealed.

The nondisclosure portion determination unit 1201 acquires, from the input information, text data contained in a topic segment to be subjected to concealing processing. A cue word is extracted from the text data, and if the cue word is not stored in the nondisclosure-portion determination rule database 102, it is added thereto.

On the other hand, the nondisclosure portion determination unit 1201 acquires, from the input information, text data contained in a topic segment to be subjected to revealing processing. A cue word is extracted from the text data, and if the cue word is stored in the nondisclosure-portion determination rule database 102, it may be deleted therefrom.

Figure 13:
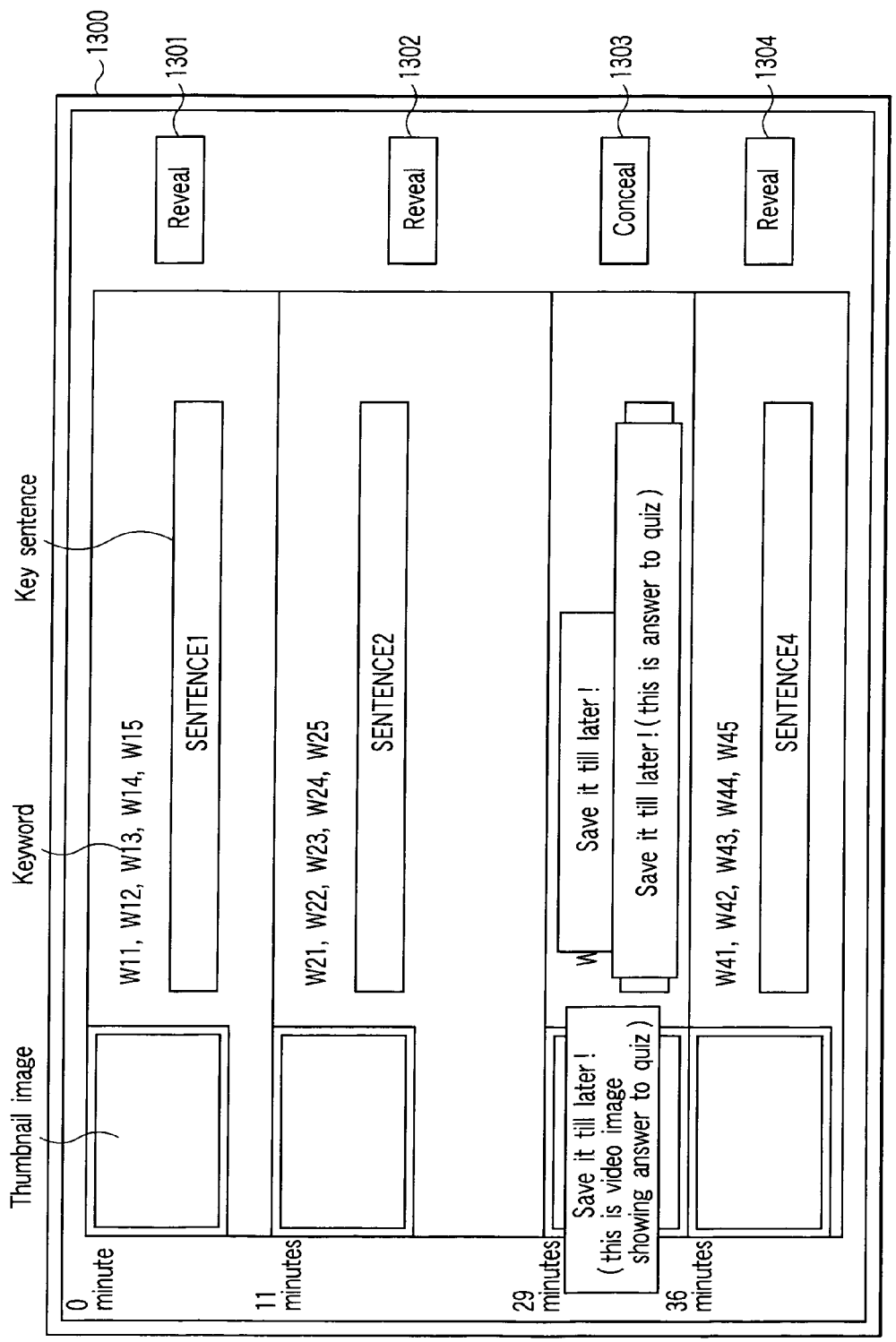
FIG. 13 is a view illustrating an example of a series-of-topic image output from the output unit appearing in FIG. 12.

Referring to FIG. 13, a display example of the topic list screen employed in the second embodiment will be described. The display example of FIG. 13 differs from that of FIG. 7 employed in the first embodiment only in that the former includes a button for enabling the user to manually reveal or conceal the data of each topic segment.

In the example of FIG. 13, the data of the third topic segment is concealed, i.e., is in the "concealed state". However, if the user clicks the button, the banner that conceals a thumbnail image, keyword and key sentence disappears, thereby revealing them to the user. In contrast, when the data of a certain topic segment is revealed (is in the "revealed state"), the user can change the state of the topic segment to the "concealed state" by clicking the button.

Even if the determination accuracy of the nondisclosure portion determination unit 1201 is not so high, its determination accuracy can be enhanced when the determination unit 1201 and input section 1202 operate as described above, and the user makes appropriate modifications.

Assume, for instance, that nondisclosure portion determination rule data for quiz programs includes a cue word "Let's see what the right answer is" but does not include a cue word "Here is the correct answer". If there is a topic segment that begins with the expression "Here is the correct answer", it may be erroneously determined to be a disclosure portion, thereby providing the user with answer information that should not be beforehand provided to the user.

At this time, if the user instructs, via the input unit 1202, the nondisclosure portion determination unit 1201 to hereinafter treat, as a nondisclosure portion, such a segment as the above, the nondisclosure portion determination unit 1201 can add a new cue word "Here is the correct answer" to the nondisclosure portion determination rule data stored in the nondisclosure-portion determination rule database 102.

In addition, in FIG. 13, instead of causing the user to determine whether the entire data of each topic segment should be revealed or concealed, the way of designation, e.g., the way of removing, by, for example, dragging, the banner that covers a thumbnail image, keyword or key sentence, may be imparted to the user.

Figure 14:
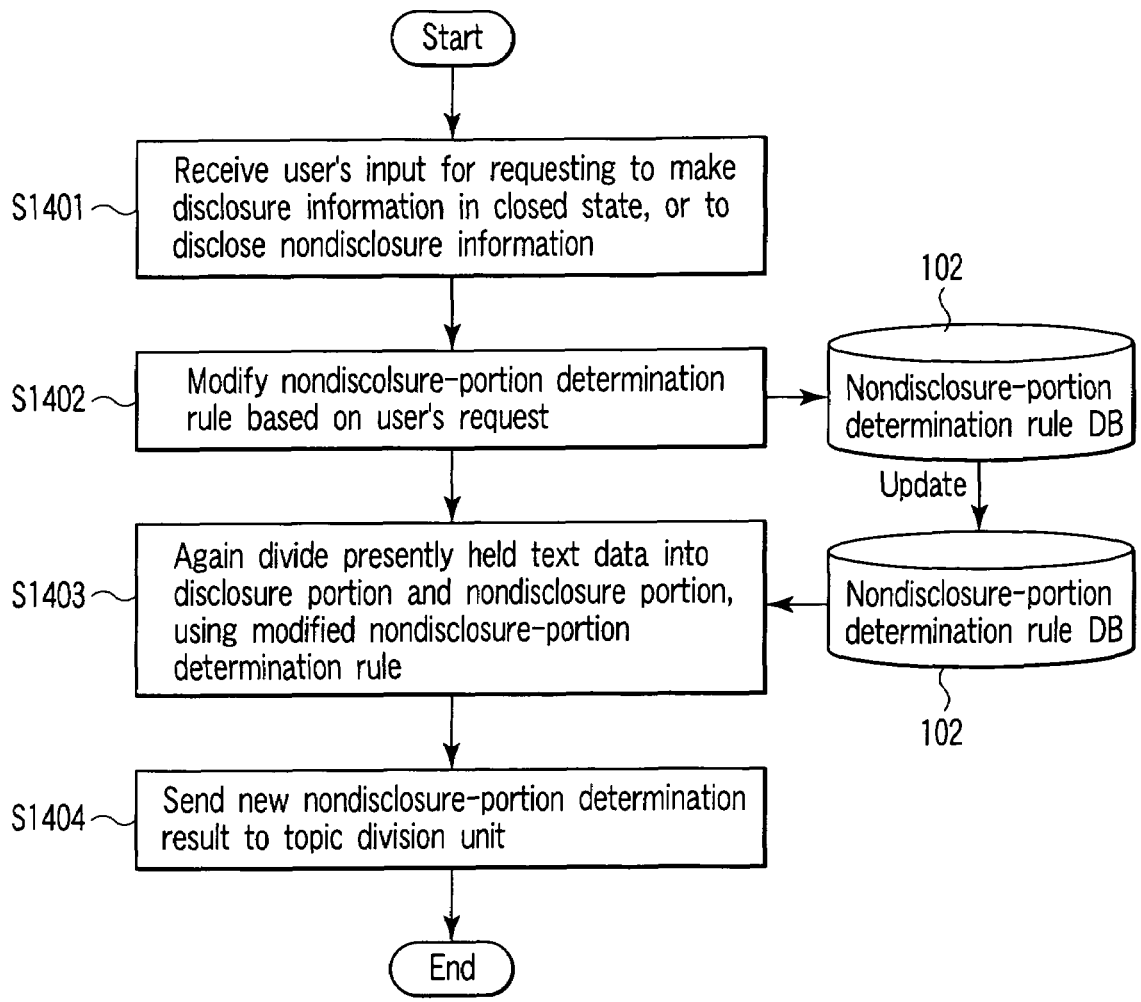
FIG. 14 is a flowchart illustrating an example of a processing flow in the nondisclosure portion determination unit appearing in FIG. 12.

Referring to FIG. 14, the feedback process performed by the nondisclosure portion determination unit 1201 of FIG. 12 will be described.

When the user inputs, via the input unit 1202, request of disclosing a nondisclosure portion or making a disclosure portion in a closed state (step S1401), the nondisclosure portion determination unit 1201 modifies the nondisclosure portion determination rule data stored in the nondisclosure-portion determination rule database 102 (step S1402).

Subsequently, using the modified nondisclosure portion determination rule data, the currently stored text data is again subjected to nondisclosure portion determination (step S1403), and the determination result is supplied to the topic division unit 103 (step S1404).

Thereafter, the topic division unit 103 and topic-list generation unit 105 perform the same processes as in the first embodiment. As a result, the user's feedback information is instantly reflected in the screen image.

By enabling the user to modify the information to specify the information to be disclosed or kept in the closed state, the accuracy of nondisclosure portion determination can be increased to a certain degree as the user wishes.

The main purpose of the conventional relevance feedback technique is to recommend a topic document in accordance with the interest of a user. In the second embodiment, the user can reflect, in the system, the information that they want or do not want to disclose before actual viewing, with the result that selective viewing that does not spoil their enjoyment of viewing can be realized.

In the above-described embodiments, the interface, which induces the user to perform selective viewing using program topic division, is free from providing, to the user before actual viewing, information that they do not want to have. Accordingly, spoiling of users' enjoyment of viewing programs can be avoided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video viewing support system comprising:
a video acquisition unit configured to acquire a video content from a video source;
a data acquisition unit configured to acquire text data corresponding to the video content from a text data source, the text data being related to time information contained in the video content;
a storage unit configured to store a plurality of cue words for identifying nondisclosure portions of the video content;
a comparison unit configured to compare the text data with the cue words to specify a first nondisclosure portion of the video content as being unsuitable for viewing before viewing other portions of the video content, and to specify a disclosure portion of the video content as being suitable for viewing before viewing the other portions of the video content;
a topic extraction unit configured to extract a plurality of topics from the video content based on the text data, the topics representing interest scenes of the video content;
a division unit configured to divide the video content into a plurality of video content segments for each of the topics, the video content segments representing a part of the video content and corresponding to one of the first nondisclosure portion and the disclosure portion;
a generation unit configured to generate at least one of a first thumbnail image, a first keyword, or a first key sentence for the video content segments corresponding to the disclosure portion, and at least one of a second thumbnail image, a second keyword, or a second key sentence for the video content segments corresponding to the first nondisclosure portion;
a concealing unit configured to conceal at least a portion of the at least one of the second thumbnail image, the second keyword, or the second key sentence;
a providing unit configured to provide, after the concealing unit conceals the at least one portion, a plurality of combinations of the video content segments and at least one of the second thumbnail image, the second keyword, or the second key sentence segments; and
a selection unit configured to select at least one of the combinations manually.

2. The system according to claim 1, wherein the concealing unit is configured to conceal one of the video content segments corresponding to the first nondisclosure video portion.

3. The system according to claim 1, wherein the concealing unit is configured to conceal the at least one portion of the at least one of the second thumbnail image, the second keyword, or the second key sentence by covering the portion with a nondisclosure tag.

4. The system according to claim 3, wherein the nondisclosure tag includes at least one of a banner, a balloon, a hatching tag, a blurring tag and a mosaic tag.

5. The system according to claim 1, wherein the topic extraction unit is configured to extract the topics as one of a start point and an end point of each of the topics, using at least one of a starting point and an end point of the first nondisclosure video portion.

6. The system according to claim 1, further comprising an accepting unit configured to accept an operation for disclosing the concealed portion for each of the combinations, and configured to accept an operation for concealing, for each of the combinations, a disclosed portion other than the concealed portion and included in at least one of the second thumbnail image, the second keyword, or the second key sentence, and
wherein the storage unit erases a first cue word corresponding to a second nondisclosure video portion which is included in the video content segments, the concealed portion being disclosed in the second nondisclosure video portion, when the accepting unit accepts the operation for disclosing the concealed portion, and the storage unit adds a second cue word corresponding to a third nondisclosure video portion which is included in the video content segments, the disclosed portion being concealed in the third nondisclosure video portion, when the accepting unit accepts the operation for concealing the disclosed portion.

7. A video viewing support system comprising:
a video acquisition unit configured to acquire a video content from a video source;
a data acquisition unit configured to acquire text data corresponding to the video content from a text data source, the text data being related to time information contained in the video content;
a storage unit configured to store a plurality of cue words for identifying nondisclosure portions of the video content;
a comparison unit configured to compare the text data with the cue words to specify a first nondisclosure portion of the video content as being unsuitable for viewing before viewing other portions of the video content, and to specify a disclosure portion of the video content as being suitable for viewing before viewing the other portions of the video content;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content and corresponding to one of the first nondisclosure portion and the disclosure portion;
a generation unit configured to generate, as a disclosed portion, at least one of a thumbnail image, a keyword, or a key sentence which correspond to video content segments which do not contain the first nondisclosure video portion;
a providing unit configured to provide a plurality of combinations of the video content segments and at least one of the thumbnail image, the keyword, or the key sentence; and a selection unit configured to select at least one of the combinations manually.

8. The system according to claim 7, wherein the topic extraction unit is configured to extract the topics as one of a start point and an end point of each of the topics using at least one of a starting point and an end point of the first nondisclosure video portion.

9. The system according to claim 7, further comprising an accepting unit configured to accept an operation for concealing, for each of the combinations, the disclosed portion, and configured to accept an operation for disclosing, for each of the combinations, a concealed portion other than the disclosed portion and included in at least one of the thumbnail image, the keyword and the key sentence, and
wherein the storage unit erases a first cue word corresponding to a second nondisclosure video portion which is included in the video content segments, the concealed portion being disclosed in the second nondisclosure video portion, when the accepting unit accepts the operation for disclosing the concealed portion, and the storage unit adds a second cue word corresponding to a third nondisclosure video portion which is included in the video content segments, the disclosed portion being concealed in the third nondisclosure video portion, when the accepting unit accepts the operation for concealing the disclosed portion.

10. A video viewing support system comprising:
a video acquisition unit configured to acquire a video content from a video source;
a data acquisition unit configured to acquire text data corresponding to the video content from a text data source, the text data being related to time information contained in the video content;
a storage unit configured to store a plurality of cue words for identifying nondisclosure portions of the video content;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content;
a comparison unit configured to compare the text data with the cue words to determine whether the video content segments correspond to a first nondisclosure portion of the video content that is unsuitable for viewing before viewing other portions of the video content;
a generation unit configured to generate at least one of a first thumbnail image, a first keyword, or a first key sentence for the video content segments corresponding to a disclosure portion of the video content, and at least one of a second thumbnail image, a second keyword, or a second key sentence for the video content segments corresponding to the first nondisclosure portion;
a concealing unit configured to conceal at least a portion of the at least one of the second thumbnail image, the second keyword, or the second key sentence of the video content segments corresponding to the first nondisclosure portion;
a providing unit configured to provide, after the concealing unit conceals the at least one portion, a plurality of combinations of the video content segments and at least one of the second thumbnail image, the second keyword, or the second key sentence; and
a selection unit configured to select at least one of the combinations manually.

11. The system according to claim 10, wherein the concealing unit is configured to conceal the at least one portion based on the cue words.

12. The system according to claim 10, wherein the concealing unit is configured to conceal the portion of the second thumbnail image, the second keyword, or the second key sentence by covering the portion with a nondisclosure tag.

13. The system according to claim 10, wherein the nondisclosure tag includes at least one of a banner, a balloon, a hatching tag, a blurring tag and a mosaic tag.

14. The system according to claim 10, further comprising an accepting unit configured to accept an operation for disclosing the concealed portion for each of the combinations, and configured to accept an operation for concealing, for each of the combinations, a disclosed portion other than the concealed portion and included in at least one of the second thumbnail image, the second keyword, or the second key sentence, and wherein the storage unit erases a first cue word corresponding to a second nondisclosure portion which is included in the video content segments, the concealed portion being disclosed in the second nondisclosure portion, when the accepting unit accepts the operation for disclosing the concealed portion, and the storage unit adds a second cue word corresponding to a third nondisclosure portion which is included in the video content segments, the disclosed portion being concealed in the third nondisclosure portion, when the accepting unit accepts the operation for concealing the disclosed portion.

15. A video viewing support system comprising:
a video acquisition unit configured to acquire a video content from a video source;
a data acquisition unit configured to acquire text data corresponding to the video content from a text data source, the text data being related to time information contained in the video content;
a storage unit configured to store a plurality of cue words for identifying nondisclosure portions of the video content;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content;
a comparison unit configured to compare the text data with the cue words to determine whether the video content segments correspond to a first nondisclosure portion of the video content that is unsuitable for viewing before viewing other portions of the video content;
a generation unit configured to generate, as a disclosed portion, at least one of a thumbnail image, a keyword, or a key sentence which correspond to video content segments which do not correspond to the first nondisclosure portion;
a providing unit configured to provide a plurality of combinations of the video content segments and at least one of the thumbnail image, the keyword, or the key sentences; and
a selection unit configured to select at least one of the combinations manually.

16. The system according to claim 15, further comprising an accepting unit configured to accept an operation for concealing, for each of the combinations, the disclosed portion, and configured to accept an operation for disclosing, for each of the combinations, a concealed portion other than the disclosed portion and included in at least one of the thumbnail image, the keyword, or the key sentence, and wherein the storage unit erases a first cue word corresponding to a first nondisclosure portion which is included in the video content segments, the concealed portion being disclosed in the first nondisclosure portion, when the accepting unit accepts the operation for disclosing the concealed portion, and the storage unit adds a second cue word corresponding to a second nondisclosure portion which is included in the video content segments, the disclosed portion being concealed in the second nondisclosure portion, when the accepting unit accepts the operation for concealing the disclosed portion.

17. A video viewing support method comprising:
acquiring a video content from a video source;
acquiring text data corresponding to the video content from a text data source, the text data being related to time information contained in the video content;
storing a plurality of cue words for identifying nondisclosure portions of the video content;
comparing the text data with the cue words to specify a first nondisclosure portion of the video content as being unsuitable for viewing before viewing other portions of the video content, and to specify a disclosure portion of the video content as being suitable for viewing before viewing the other portions of the video content;
extracting a plurality of topics from the video content based on the text data, the topics representing interest scenes of the video content;
dividing the video content into a plurality of video content segments for each of the topics, the video content segments representing a part of the video content and corresponding to one of the first nondisclosure portion and the disclosure portion;
generating at least one of a first thumbnail image, a first keyword, or a first key sentence for the video content segments corresponding to the disclosure portion, and at least one of a second thumbnail image, a second keyword, or a second key sentence for the video content segments corresponding to the first nondisclosure portion;
concealing at least a portion of the at least one of the second thumbnail image, the second keyword, or the second key sentence;
providing, after the concealing unit conceals the at least the one portion, a plurality of combinations of the video content segments and at least one of the second thumbnail image, the second keyword, or the second key sentence segments; and
selecting at least one of the combinations manually.

18. A video viewing support method comprising:
acquiring a video content from a video source;
acquiring text data corresponding to the video content from a text data source, the text data being related to time information contained in the video content;
storing a plurality of cue words for identifying nondisclosure portions of the video content;
comparing the text data with the cue words to specify a first nondisclosure portion of the video content as being unsuitable for viewing before viewing other portions of the video content, and to specify a disclosure portion of the video content as being suitable for viewing before viewing the other portions of the video content;
extracting a plurality of topics from the video content based on the text data, the topics representing interest scenes of the video content;

dividing the video content into a plurality of video content segments for each of the topics, each of the video content segments representing a part of the video content and corresponding to one of the first nondisclosure portion and the disclosure portion;

generating, as a disclosed portion, at least one of a thumbnail image, a keyword, or a key sentence which correspond to video content segments which do not contain the first nondisclosure video portion;

providing a plurality of combinations of the video content segments and at least one of the thumbnail image, the keyword, or the key sentence; and selecting at least one of the combinations manually.

19. A video viewing support method comprising:

acquiring a video content from a video source;

acquiring text data corresponding to the video content from a text data source, the text data being related to time information contained in the video content;

storing a plurality of cue words for identifying nondisclosure portions of the video content;

extracting a plurality of topics from the video content based on the text data, the topics representing interest scenes of the video content;

dividing the video content into a plurality of video content segments for each of the topics, each of the video content segments representing a part of the video content;

comparing the text data with the cue words to determine whether the video content segments correspond to a first nondisclosure portion of the video content that is unsuitable for viewing before viewing other portions of the video content;

generating at least one of a first thumbnail image, a first keyword, or a first key sentence for the video content segments corresponding to a disclosure portion of the video content, and at least one of a second thumbnail image, a second keyword, or a second key sentence for the video content segments corresponding to the first nondisclosure portion;

concealing at least a portion of the at least one of the second thumbnail image, the second keyword, or the second key sentence of the video content segments corresponding to the first nondisclosure portion;

providing, after concealing the at least one portion, a plurality of combinations of the video content segments and at least one of the second thumbnail image, the second keyword, or the second key sentence; and selecting at least one of the combinations manually.

20. A video viewing support method comprising:

acquiring a video content from a video source;

acquiring text data corresponding to the video content from a text data source, the text data being related to time information contained in the video content;

storing a plurality of cue words for identifying nondisclosure portions of the video content;

extracting a plurality of topics from the video content based on the text data, the topics representing interest scenes of the video content;

dividing the video content into a plurality of video content segments for each of the topics, each of the video content segments representing a part of the video content;

comparing the text data with the cue words to determine whether the video content segments correspond to a first nondisclosure portion of the video content that is unsuitable for viewing before viewing other portions of the video content;

generating, as a disclosed portion, at least one of a thumbnail image, a keyword, or a key sentence which correspond to video content segments which do not correspond to the first nondisclosure portion;

providing a plurality of combinations of the video content segments and at least one of the thumbnail image, the keyword, or the key sentence; and selecting at least one of the combinations manually.

21. A video viewing support system comprising:

a video acquisition unit configured to acquire a video content from a video source;

a data acquisition unit configured to acquire text data corresponding to the video content from a text data source;

a topic extraction unit configured to extract a plurality of topics from the video content based on the text data, the topics representing interest scenes of the video content;

a division unit configured to divide the video content into a plurality of video content segments for each of the topics, each of the video content segments representing a part of the video content;

a generation unit configured to generate at least one of a first thumbnail image, a first keyword or a first key sentence which correspond to each of the video content segments, respectively, and at least one of a second thumbnail image, a second keyword or a second key sentence;

a storage unit configured to store a plurality of cue words corresponding to a plurality of video portions, each of the video portions being included in the video content segments;

a comparison unit configured to compare the text data with the cue words to specify a first video portion of the video portions as being unsuitable for viewing before viewing other portions of the video content, the first video portion corresponding to a first cue word of the cue words;

a concealing unit configured to conceal at least one portion of the at least one of the second thumbnail image, the second keyword or the second key sentence, which correspond to the specified first video portion and generate a concealed portion;

a providing unit configured to provide, after the concealing unit conceals at least the one portion, a combination of each of the video content segments and at least one of the second thumbnail image, the second keyword and the second key sentence which correspond to each of the video content segments, to provide a plurality of combinations;

a selection unit configured to select at least one of the combinations manually; and an accepting unit configured to accept an operation for disclosing the concealed portion for each of the combinations, and configured to accept an operation for concealing, for each of the combinations, a disclosed portion other than the concealed portion and included in at least one of the thumbnail image, the keyword or the key sentence, and wherein the storage unit erases a second cue word corresponding to a second video portion which is included in the video content segments, the concealed portion being disclosed in the second video portion, when the accepting unit accepts the operation for disclosing the concealed portion, and the storage unit adds a third cue word corresponding to a third video portion which is included in the video content segments, the disclosed portion being concealed in the third video portion, when the accepting unit accepts the operation for concealing the disclosed portion.

22. A video viewing support system comprising:
a video acquisition unit configured to acquire a video content from a video source;
a data acquisition unit configured to acquire text data corresponding to the video content from a text data source;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content;
a storage unit configured to store a plurality of cue words corresponding to a plurality of video portions, each of the video portions being included in the video content segments;
a comparison unit configured to compare the text data with the cue words to specify a first video portion of the video portions as being unsuitable for viewing before viewing other portions of the video content, the first video portion corresponding to a first cue word of the cue words;
a generation unit configured to generate, as a disclosed portion, at least one of a thumbnail image, a keyword or a key sentence which correspond to each of the video content segments, respectively, which fail to contain the specified first video portion;
a providing unit configured to provide a combination of each of the video content segments and at least one of the thumbnail image, the keyword or the key sentence which correspond to each of the video content segments, to provide a plurality of combinations;
a selection unit configured to select at least one of the combinations manually; and
an accepting unit configured to accept an operation for concealing, for each of the combinations, the disclosed portion, and configured to accept an operation for disclosing, for each of the combinations, a concealed portion other than the disclosed portion and included in at least one of the thumbnail image, the keyword or the key sentence, and
wherein the storage unit erases a second cue word corresponding to a second video portion which is included in the video content segments, the concealed portion being disclosed in the second video portion, when the accepting unit accepts the operation for disclosing the concealed portion, and the storage unit adds a third cue word corresponding to a third video portion which is included in the video content segments, the disclosed portion being concealed in the third video portion, when the accepting unit accepts the operation for concealing the disclosed portion.

23. A video viewing support system comprising:
a video acquisition unit configured to acquire a video content from a video source;
a data acquisition unit configured to acquire text data corresponding to the video content from a text data source;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content;
a generation unit configured to generate at least one of a first thumbnail image, a first keyword or a first key sentence which correspond to each of the video content segments, respectively, and at least one of a second thumbnail image, a second keyword or a second key sentence;
a storage unit configured to store a plurality of cue words corresponding to a plurality of video portions, each of the video portions being included in the video content segments;
a comparison unit configured to compare the text data with the cue words to determine whether each of the video content segments is unsuitable for viewing before viewing other portions of the video content based at least on whether each of the video content segments contains one of the video portions corresponding to the cue words;
a concealing unit configured to conceal at least one portion of the at least one of the second thumbnail image, the second keyword or the second key sentence which correspond to one of the video content segments which is determined to contain one of the video portions corresponding to the cue words by the comparison unit;
a providing unit configured to provide, after the concealing unit conceals at least the one portion, a combination of each of the video content segments and at least one of the second thumbnail image, the second keyword or the second key sentence which correspond to each of the video content segments, to provide a plurality of combinations;
a selection unit configured to select at least one of the combinations manually; and
an accepting unit configured to accept an operation for disclosing the concealed portion for each of the combinations, and configured to accept an operation for concealing, for each of the combinations, a disclosed portion other than the concealed portion and included in at least one of the thumbnail image, the keyword or the key sentence, and
wherein the storage unit erases a first cue word corresponding to a first video portion which is included in the video content segments, the concealed portion being disclosed in the first video portion, when the accepting unit accepts the operation for disclosing the concealed portion, and the storage unit adds a second cue word corresponding to a second video portion which is included in the video content segments, the disclosed portion being concealed in the second video portion, when the accepting unit accepts the operation for concealing the disclosed portion.

24. A video viewing support system comprising:
a video acquisition unit configured to acquire a video content from a video source;
a data acquisition unit configured to acquire text data corresponding to the video content from a text data source;
a topic extraction unit configured to extract a plurality of topics from the video content based on the text data, the topics representing interest scenes of the video content;
a division unit configured to divide the video content into a plurality of video content segments for each of the topics, each of the video content segments representing a part of the video content;
a storage unit configured to store a plurality of cue words corresponding to a plurality of video portions, each of the video portions being included in the video content segments;
a comparison unit configured to compare the text data with the cue words to determine whether each of the video content segments is unsuitable for viewing before viewing other portions of the video content based at least on whether each of the video content segments contains one of the video portions corresponding to the cue words;

a generation unit configured to generate, as a disclosed portion, at least one of a thumbnail image, a keyword or a key sentence which correspond to each of the video content segments, respectively, which fail to contain one of the video portions corresponding to the cue words;

a providing unit configured to provide a combination of each of the video content segments and at least one of the thumbnail image, the keyword or the key sentence which correspond to each of the video content segments, to provide a plurality of combinations;

a selection unit configured to select at least one of the combinations manually; and an accepting unit configured to accept an operation for concealing, for each of the combinations, the disclosed portion, and configured to accept an operation for disclosing, for each of the combinations, a concealed portion other than the disclosed portion and included in at least one of the thumbnail image, the keyword or the key sentence, and wherein the storage unit erases a first cue word corresponding to a first video portion which is included in the video content segments, the concealed portion being disclosed in the first video portion, when the accepting unit accepts the operation for disclosing the concealed portion, and the storage unit adds a second cue word corresponding to a second video portion which is included in the video content segments, the disclosed portion being concealed in the second video portion, when the accepting unit accepts the operation for concealing the disclosed portion.

* * * * *